United States Patent [19]
Hill et al.

[11] Patent Number: 5,471,239
[45] Date of Patent: Nov. 28, 1995

[54] DETECTING SCENE CHANGES

[75] Inventors: Philip N. C. Hill, Newbury; Bruce W. Randall, Banbury, both of Great Britain

[73] Assignee: Solid State Logic Limited, Oxfordshire, England

[21] Appl. No.: 142,461

[22] PCT Filed: Mar. 26, 1993

[86] PCT No.: PCT/GB93/00634

§ 371 Date: Dec. 8, 1993

§ 102(e) Date: Dec. 8, 1993

[87] PCT Pub. No.: WO93/19467

PCT Pub. Date: Sep. 30, 1993

[51] Int. Cl.$^6$ .................................................. H04N 7/18
[52] U.S. Cl. ............................................. 348/155; 348/700
[58] Field of Search ...................................... 348/154, 155, 348/700, 701; H04N 7/18

[56] References Cited

U.S. PATENT DOCUMENTS

| | | | |
|---|---|---|---|
| 4,774,570 | 9/1988 | Araki | 354/402 |
| 4,774,574 | 9/1988 | Daly et al. | 348/402 |
| 5,001,559 | 3/1991 | Gonzales | 348/400 |
| 5,032,905 | 7/1991 | Koga | 348/700 |
| 5,099,322 | 3/1992 | Gove | 348/700 |

FOREIGN PATENT DOCUMENTS

| | | |
|---|---|---|
| A0268270 | 5/1988 | European Pat. Off. . |
| A0378393 | 7/1990 | European Pat. Off. . |
| A0489301 | 6/1992 | European Pat. Off. . |
| 2158324 | 11/1985 | United Kingdom . |
| 2195810 | 4/1988 | United Kingdom . |
| 2235815 | 3/1991 | United Kingdom . |

OTHER PUBLICATIONS

Patent Abstracts of Japan, vol. 13, No. 285 (E–780) 29 Jun. 1989 & JP, A, 10 68 084 (Nippon Telegraph & Teleph Corp (NTT) 14 Mar. 1989.
Patent Abstracts of Japan, vol. 10, No. 8 (E–373) 14 Jan. 1986 & JP, A. 60 172 892 (Toshiba K.K.) 6 Sept. 1985.
Bonomi, "Multimedia and CD–ROM: An Overview of JPEG, MPEG and the future", CD–ROM Professional, vol. 4, No. 6, Nov. 1991, USA, pp. 38–40.

*Primary Examiner*—Howard W. Britton
*Attorney, Agent, or Firm*—Nixon & Vanderhye

[57] ABSTRACT

Scene changes in a video sequence are detected by generating data representing the amount of information present in each video frame. This information is processed in such a way that significant changes in the information content are identified as positions where scene changes are likely to occur. The amount of information present in each video frame is determined by compressing the video in accordance with a spatial algorithm, such as JPEG. Under such compression techniques, the amount of data present after compression will vary, depending upon the amount of information present in the original scenes. Thus, for each frame, information is available identifying the amount of data present in the compressed video. This information is analysed on a frame-by-frame basis, providing information identifying the presence of scene changes. In a facility for editing the video, or editing audio for synchronisation against a video track, the scene change information may be displayed to an operator. In a security system, the occurrence of a scene change may be identified as an intruder entering an area observed by a camera. On detecting an intruder, in this way, various measures may be taken, such as activating a video tap recorder.

27 Claims, 6 Drawing Sheets

DETECTING SCENE CHANGES

FIELD OF THE INVENTION

The present invention relates to methods and apparatus for detecting the position of scene changes in video sequences.

BACKGROUND OF THE INVENTION

In professional television production, it is conventional practice to use a first medium for recording the video pictures and a second medium for recording the sound. Subsequently, editing may be performed separately upon the recorded images and again separately upon the recorded sound, often with additional sounds being added to the sound track recorded during the initial production. Thereafter, the vision and the sound are brought together to produce the final result.

As used herein, pictures recorded or transmitted in electrical form will be referred to as video signals, sound transmitted or recorded in electrical form will be referred to as audio signals and the combination of the two will be referred to as television signals. Thus, as previously described, the final editing step involves the combining of edited video with edited audio to produce a television signal, in which the sound is synchronised with the pictures.

The majority of editing procedures consist of initially editing the video signals and, thereafter, adding the audio track to the previously edited video track. This may involve combining audio signals from many different sources and audio mixing facilities for performing this combination of different source material are known. However, a problem with editing an audio track to a previously edited video track is that it can take a significant amount of time to locate positions within the video track at which changes are to occur to the audio track. Usually, these changes take place when the video track cuts between scenes, or when something significant happens to the video pictures.

It is an object of the present invention to provide a method of detecting the position of scene changes in video sequences.

SUMMARY OF THE INVENTION

According to a first aspect of the present invention, there is provided a method of detecting the position of a scene change in a video sequence, characterised by the steps of generating data representing the information content of each video frame; processing said data to locate significant changes in said information content and identifying the position of said significant changes, so as to identify the position of likely scene changes.

In a preferred embodiment, information content is determined by compressing the video data and assessing how much data is present after compression. Compression may be performed in accordance with the JPEG standard for spatial compression, wherein, the amount of data resulting for each frame (after compression has taken place) will vary, in dependence upon the information content of the initial source frame.

In a preferred embodiment, the method is used to identify scene changes in a previously edited video sequence, allowing an audio track to be edited to said video sequence.

In a second preferred embodiment, scene changes are detected in un-edited video, to facilitate the editing of the video material. Preferably, the editing of source video material is performed together with the editing of source audio material, thereby removing the constraint of having to edit either the audio material of the video material first.

The previously described preferred embodiments relate to using the inventive technique on recorded video. In a preferred third embodiment, the method is used on live video, possibly produced by a video camera. Thus, the method may be employed in security systems, in which a significant change in the information content of the scene may be interpreted as an intruder entering into an area subject to video surveillance. Thus, on detecting the presence of such an intruder, further measures may be taken, such as raising an alarm, activating additional circuits, switching on a recording device or improving the quality of recordings made by a recording device.

The invention will now be described by way of example only, with reference to the accompanying drawings.

DETAILED DESCRIPTION OF THE PREFERRED EMBODIMENTS

Figure 1:
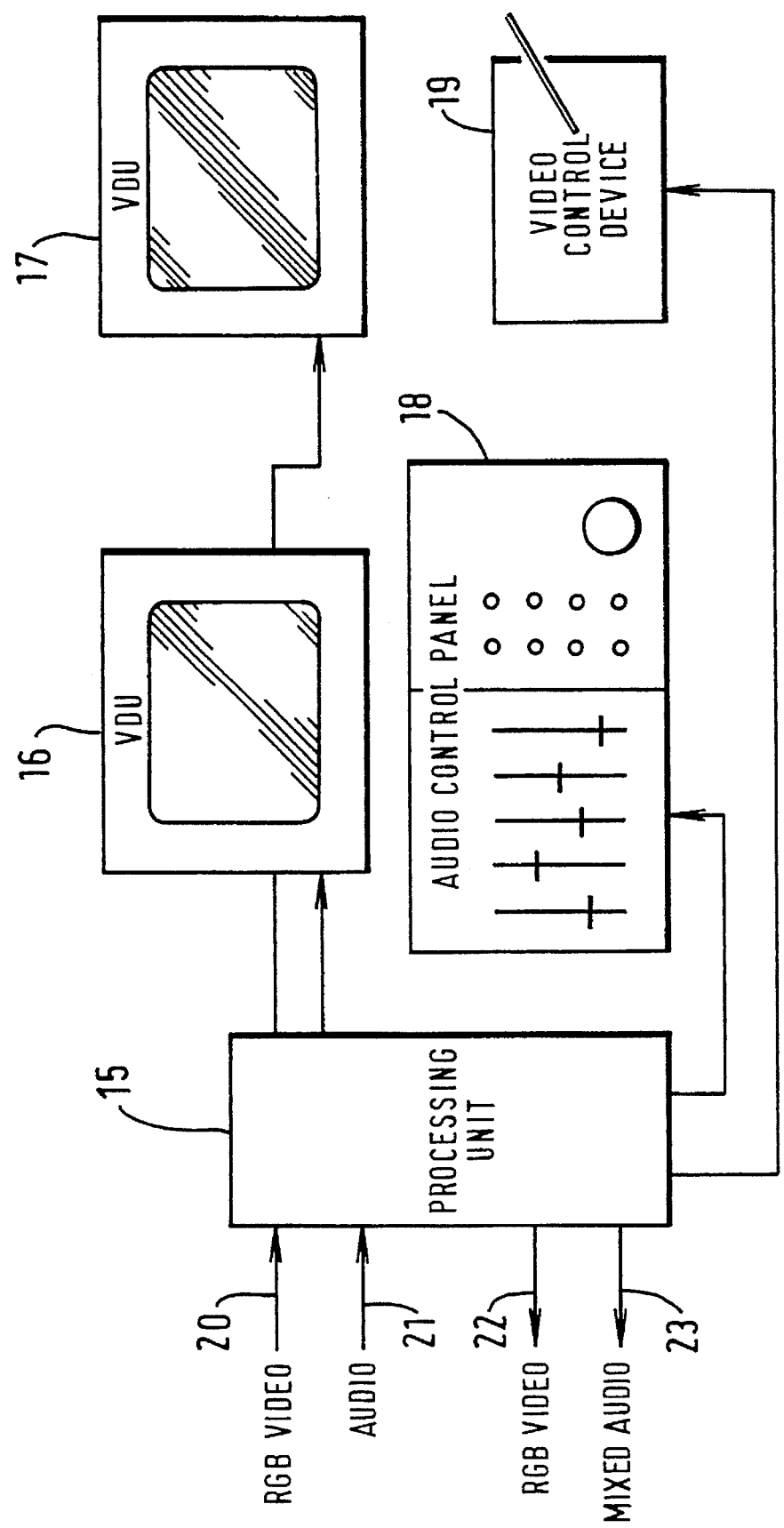
FIG. 1 shows a system for editing audio signals, to create an audio track for a previously edited video track, including an audio display, a video display and a processing unit.

The first embodiment is a digital edit suite, arranged to edit digital audio signals, for combination with a previously edited video track.

The system includes a processing unit 15, a first video display unit (VDU) 16 for displaying information relating to the audio signals and a second VDU 17, for displaying information relating to the video signals. In addition, control devices are provided in the form of an audio control panel 18 and a video control device 19, the latter having a digitising tablet and a pressure sensitive stylus.

Full bandwidth RGB video signals are supplied to the processing unit 15, via an input video port 20. Similarly, audio signals are supplied to the processing unit 15 via an audio input port 21. An output RGB video signal is available at an output port 22 and its associated mixed audio signal is supplied to an output port 23.

For the purposes of editing the audio signals to the video signals, the audio signals are spatially compressed, allowing them to be stored on conventional computer disk drives and facilitating substantially random access during the editing procedures. Thus, the output video signal at port 22 is not used as the final video result, but does provide time codes which in turn may be used to synchronise the edited audio signal supplied on output port 23 to the original full bandwidth edited video signal.

Figure 2:
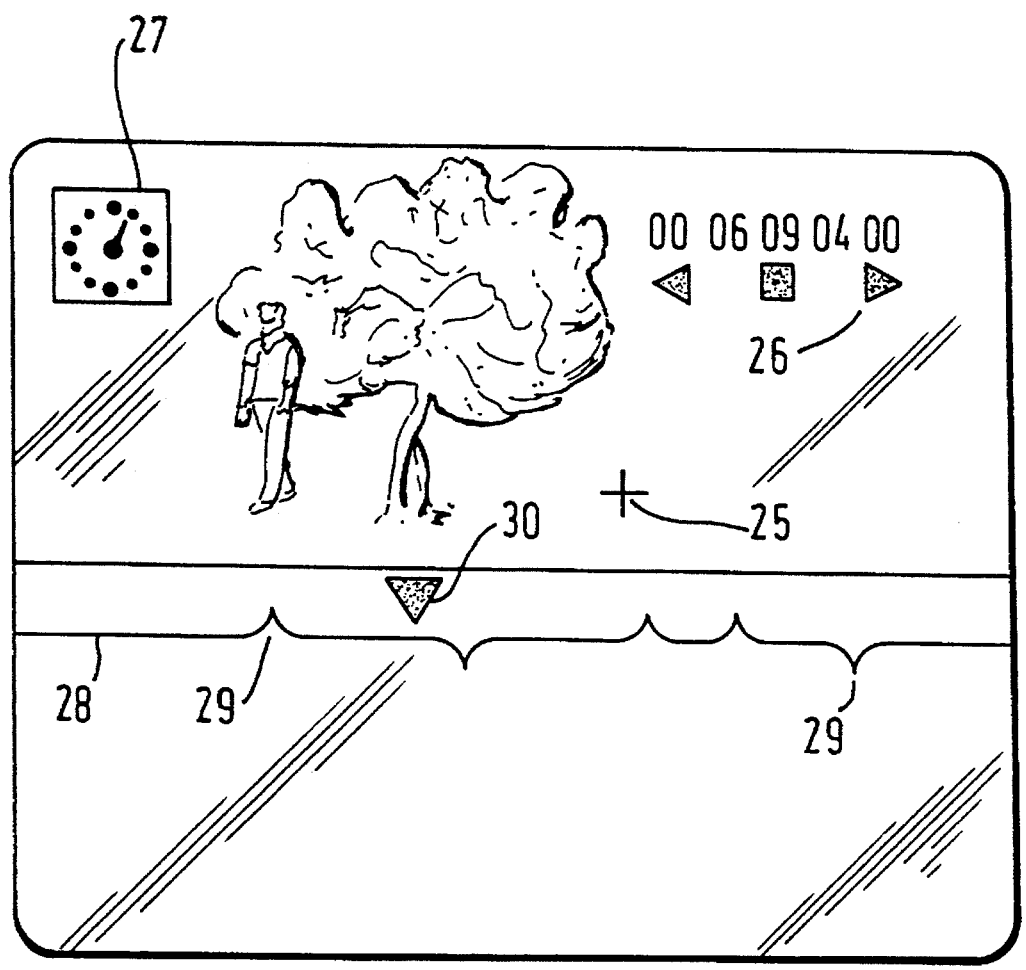
FIG. 2 shows a typical display, displayed on the video display unit shown in FIG. 1, with a scene change indicator over the video source material.

Video data supplied to port 20 is compressed by the processing circuit 15 and written to disk, whereafter, it may be accessed by operation of the stylus and touch tablet combination 19 and displayed on the video VDU 17. An example of the sort of display displayed on the video VDU 17 is shown in FIG. 2. In this example, the original video source consists of a man walking in front of a tree and on instructing the system to play, the video clip is displayed on the monitor 17. As is well known in the art, a cursor 25 is shown as part of the display and this responds to manual operation of the stylus. In addition, particular operations may be selected by placing the stylus into pressure upon the touch tablet. Thus, symbols 26 are also overlaid over the screen, which allow the stylus to be used to advance, reverse and stop the video clip. A clock 27 overlaid over the image shows the position of the video frame being displayed, with reference to the overall video source. The size of video source is dependent upon the storage provided and a typical system would allow one hour of recorded video to be stored and manipulated.

The editing of an audio track to the previously edited video is done with reference to a script, specifying the audio signals to be recorded at specific instances within the video. The video will include time codes and the actual numerical value of the time code for the frame being displayed is also displayed, in the top right hand corner, above the control icons 26. However, it is unlikely that editing instructions will have been recorded with reference to this time code, which would be a laborious process. Thus, instructions usually take the form of specifying changes to be made to the audio sound track in response to particular actions taking place in the video scene. In particular, a significant change in the audio score usually takes place when a significant change occurs to the image, particularly, when the video image cuts to a different scene.

In order to facilitate the detection of these scene changes, a display 28 is also overlaid which consists substantially of a solid horizontal line, the length of which is proportional to the number of elapsed frames. This line represents the average amount of data present in the video in frames and, when said amount of data changes abruptly, perturbations are made to the line, such as those indicated by reference 29. The polarity of the perturbations is not particularly relevant but their presence indicates that something significant has happened to the scene at that particular point.

Above the scene change display, a position pointer 30 is provided which indicates the position of the frame being displayed with reference to the scene change display. In addition, cursor 25 may be moved to the position of pointer 30 and on placing the stylus into pressure, the pointer 30 may be moved by further operation of the stylus, thereby forwarding or reversing the position of the displayed video. Thus, by operation of the stylus upon the touch tablet, so as to manipulate the position of displayed pointer 30, an editor may quickly move the position of the video, substantially instantaneously, to the position of a specific scene change. Once a scene change has been identified, the editor may quickly determine whether this scene change is the one that he is actually looking for, with reference to the original score. Thus, after the man has walked in front of the tree, the scene may cut to the man getting into his car. This scene change would usually result in a significant change to the information content of the displayed image, resulting in a perturbation being displayed on the scene change detector line. Thus, if an editor is required to make an audio change at this position, he can quickly move to the position at which a scene change occurs and, with reference to the original script, quickly identify the particular scene change in which a cut is made from the man walking in front of the tree to the man getting in his car. Thus, after the man has got into his car he may slam the car door, the sound of which may have not been recorded. Thus, after quickly locating the point at which the scene changes, an audio editor can introduce the sound of a door closing, thereby completing the audio score.

Figure 3:
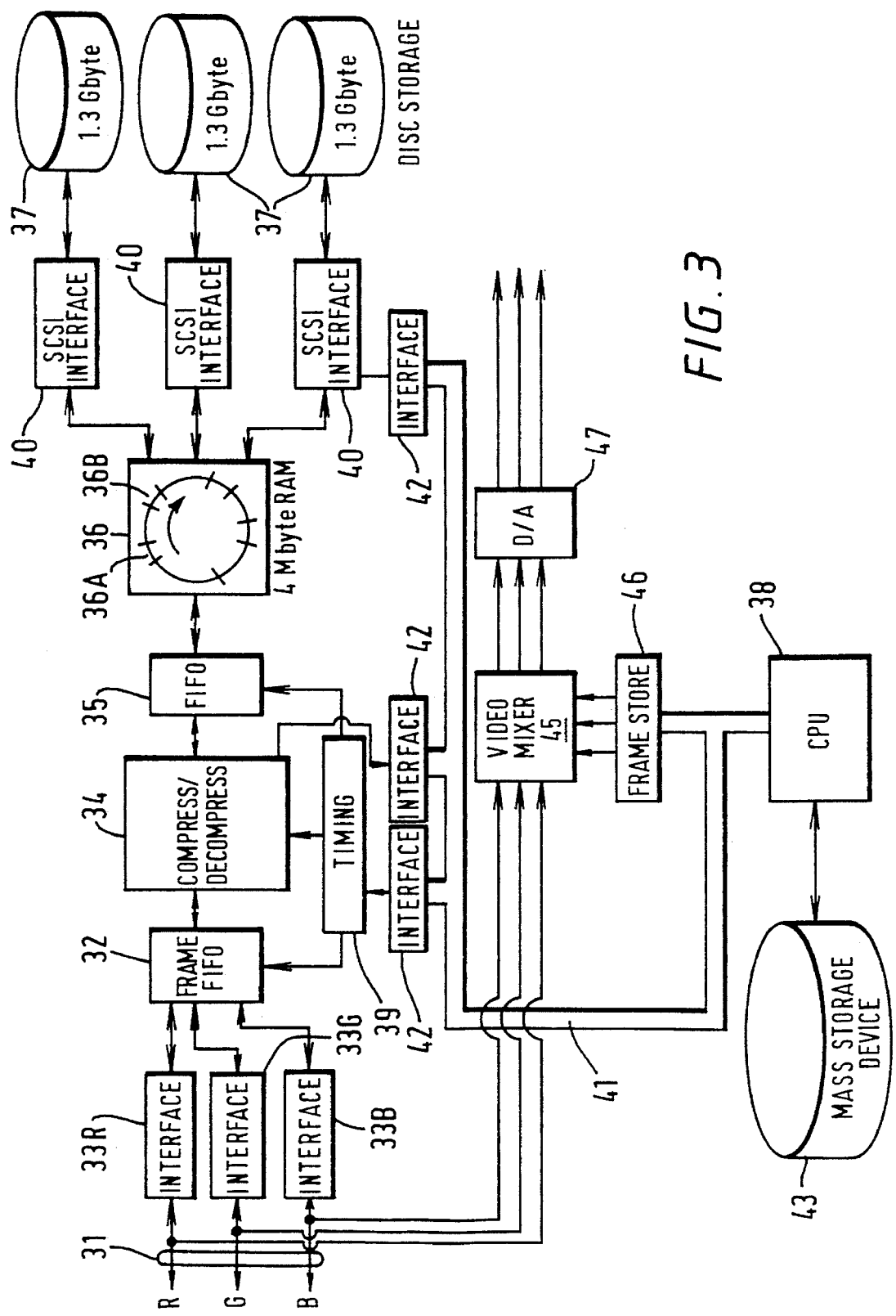
FIG. 3 details the processing unit shown in FIG. 1, including a video compression circuit and a processor.

The processing unit 15 is detailed in FIG. 3. A full bandwidth video signal is supplied to the unit as RGB components on input lines 31. The RGB components are supplied to a frame first in first out (FIFO) memory unit 32 via respective interface circuits 33. The frame FIFO 32 assembles the video data into a form suitable for being supplied to a compression chip 34 which, typically, is a C-Cube CL550 chip, supplied by C-Cube Microsystems of Milpitas, Calif., USA. The compression chip 34 is arranged to compress frames of video in accordance with the compression standard established by the Joint Photographic Expert Group (JPEG) of the United States and the full operation of this chip is described in the data book supplied by C-Cube Microsystems.

The compression circuit 34 compresses the video frames and, whereas input frames each have an equivalent amount of data, in the region of 300 kilobytes, output frames, after compression, will have an amount of data which is dependent upon the actual information content of the frame.

Output compressed frames are supplied to a two kilobyte FIFO 35, configured from fast static RAM, and are thereafter supplied to a four megabyte dynamic random access memory device (DRAM) 36, which cyclically loads the data frames into the four megabytes of memory. The cyclic nature of the four megabyte RAM is indicated by circle 36A and frame spacings are indicated by points 36B on the circle. Thus, it should be noted that the space occupied by individual frames varies, given that the data content of individual frames differs, depending upon the information content of the original video.

Data written to the cyclic DRAM 36 is thereafter written to malonetic disk thus, FIFO 35 and the DRAM 36 provide a buffer between the compression circuit 34 and the disk storage devices.

The disk storage devices themselves consist of three magnetic disk drives 37 each capable of storing one gigabyte of data. Thus, it will be appreciated, that the overall storage capacity of the system is very large, the intention being that it should be capable of storing up to one hour of compressed video.

The writing of data to the disk drives 37 is controlled by a central processing unit 38, typically a Motorola 68030 processor, having eight megabytes of onboard memory and a floating point arithmetic unit. The CPU 38 communicates with the compression circuit 34, a timing circuit 39 and interface circuits 40, via a multiplexed 16 bit bus 41. The timing circuit 39 supplies timing signals to the frame FIFO 32, the compression circuit 34 and the static RAM FIFO 35. Circuits 40 operate in accordance with the small computer standard interface (SCSI) and interface the 1.3 gigabyte drives 37 to the cyclic dynamic RAM 36. The timing circuit 39, the compression circuit 34 and SCSI interfaces 40 are themselves interfaced to the CPU bus 41 via interface circuits 42.

As previously stated, as video data compression takes place, the actual amount of data generated for each frame varies, in dependence upon the actual information content of the original frame. Thus, in order for the compressed data to be written to a drive 37, under CPU control, it is necessary for the CPU to be provided with information concerning the actual amount of data to be written. Thus, the compression circuit 34 provides information, on a frame-by-frame basis, via its interface circuit 42, to the CPU 38, identifying the amount of data present within a particular frame. In response to receiving this information, the CPU 38 provides information to a SCSI interface 40, facilitating the transfer of this information to disks 37; it being noted that a delay will be present, due to the cycling of data through the dynamic RAM 36.

CPU 38 is provided with its own local mass storage device 43, again in the form of a magnetic disk, arranged to supply programs and data to the CPU 38. In addition, the data generated by the compression circuit 34 and supplied to the CPU over interface circuit 42 and bus 41, indicative of the amount of data present for each frame after compression, is also written to disk 43. Thus, at any time, the processing unit 38 has access to information identifying the actual amount of compressed data stored for any particular frame.

The procedure for playback is substantially similar to that for recording data. In response to an operators command, the CPU 38 instructs an SCSI interface 40 to transfer data from a disk drive 37 to the four megabyte DRAM gyclic buffer 36. As data is being written to buffer 36 data is also read from said buffer 36 and supplied to the static FIFO 35. On the other side of the static FIFO 35, compressed data is supplied to the compression circuit 34, which in turn supplies decompressed data to the frame FIFO 32. From said frame FIFO 32, RGB components are read and supplied to RGB outputs 31 via respective interface circuits 33R, 33G, 33B. Thus, a majority of transmission paths within the processing units shown in FIG. 3 are bi-directional and what were used as input ports 31 during the recording process, become output ports during the playback process.

During playback, data will tend to be written to the static RAM 35 at a substantially constant rate and will, therefore, be made available to the de-compression circuit 34 at a substantially constant rate. However, the rate at which the de-compression circuit 34 is able to receive this data varies, given that frames having a large amount of data will require additional processing on the part of the de-compression circuit 34, to produce displayable video signals. Thus, static FIFO 35 provides an important buffering facility and the rate at which data is read from said FIFO to the compression circuit will vary, in dependence upon the amount of data processing required.

The decompressed video data generated by the decompression circuit 34 is not precisely in the form suitable for supplying directly to a display monitor. In particular, the RGB components are not in the required order and their rate of production is not in the required synchronisation. Thus, the decompressed video signals generated by the decompression circuit 34 are supplied to frame FIFO 32, thereafter, RGB signals may be read out to produce signals of the required type, by means of interface circuits 33.

In addition to providing an output at port 31, which may be directed to output port 22 of FIG. 1, the decompressed RGB video signals also supplied to circuitry arranged to generate the video display on monitor 17.

In particular, the decompressed RGB video signals are supplied to a video mixer 45, which receives a second signal from a frame store 46. Thus, the decompressed RGB video signal is combined with a video signal read from a frame store 46 to provide a combined video signal which is supplied to a digital to analogue convertor 47. Thereafter, the output from the digital to analogue convertor 47 is supplied to the display monitor 17.

The decompressed RGB video signal supplied to the video mixer 45 provides the background image of the recorded video, such as the man walking in front of a tree in FIG. 2. The overlaid images, in the form of a clock 27, the icons 26 and the scene change detection display 28, are assembled in the frame store 46 and the video mixer 45 is arranged to overlay signals supplied from the frame store 46 over the decompressed video image, supplied by interfaces 33. Thus, the signals supplied to the digital to analogue convertor 47, consist of the decompressed video image (the man walking in front of the tree) with the icons and displays overlaid, as shown in FIG. 2, for display on the monitor 17.

The overlaid images, assembled in the frame store 46, are generated by the processing unit 38, in response to program control and in response to data supplied from the compression circuitry and stored in storage device 43. Thus, the processing unit 38 is arranged to analyse and process the numbers generated for each frame which represent the amount of compressed data present in that frame. The processing of this information in turn generates the data required to display the scene change display element 28, as shown in FIG. 2.

Figure 4:
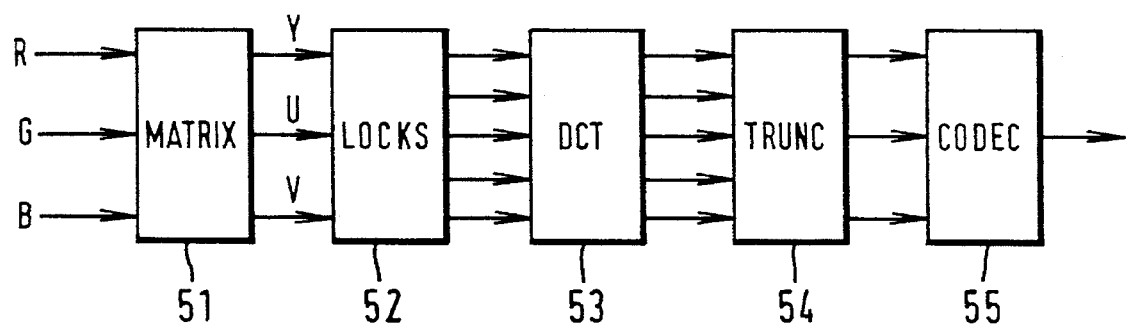
FIG. 4 details the video compression circuit shown in FIG. 3.

A schematic representation of the compression and decompression circuit 34 is shown in FIG. 4. Operation of the circuit will be described with reference to compression and it should be appreciated that the decompression procedure is substantially similar but performed in reverse.

Full bandwidth RGB video is supplied to a matrix convertor 51, arranged to convert the RGB signal into a YUV signal, consisting of luminance plus colour difference, as used in broadcast television. This conversion provides a degree of compression and introduces a level of loss.

After conversion to YUV, the image frame is divided into a number of blocks, typically consisting of eight by eight pixels or sixteen by sixteen pixels. Subsequent processing is performed for each individual block and, in some situations, it may be necessary to take additional measures to ensure that these blocks do not become visible in the final output image.

The output from circuit 52, arranged to divide the picture into a plurality of blocks, is supplied to a discrete cosine transform (DCT) circuit 53, which analyses each block and produces a plurality of frequency bands, describing the nature of the picture within a block. This process does not significantly compress the image and is substantially lossless. However it does facilitate subsequent compression.

After conversion in DCT circuit 53, the frequency bands are truncated by a truncating circuit 54 and thereafter, the data generated by truncating circuit 34 is Huffman coded by a codec 55. The Hoffman codec 55 takes advantage of the inherent redundancy of a typical video signal, in that, values generated by truncation circuit 54 which occur often are given codes consisting of fewer bits, while, conversely, signals which occur less often are given more bits, resulting in a significant level of compression with very little loss.

The data generated by the Huffman circuit 26, for a plurality of bands derived from a plurality of blocks, are combined, resulting in a serial stream of data which is written to the disk drives 37, via the buffering described with reference to FIG. 3.

The nature of the process described above is such that, whenever possible, the amount of data actually stored is minimised. This data reduction is very much dependent upon the inherent redundancy of the original data. As the actual information content of the original image increases, the amount of data required to be stored after compression also increases. Thus, the amount of data required to be stored is directly related to the information content of the original frame. As previously stated, it is necessary for this information defining the amount of data present to be transferred to the processing unit 38, so that said processing unit is in a position to instruct the interface circuits, concerning the amount of data required to be written to the disks 37 for a particular frame.

When an abrupt change occurs to the amount of data generated after compression, this is indicative of a change in the nature of the original video input signal. More often than not, this change will be due to a change in the nature of the scene being recorded in the first place, which will often be due to a scene change in the story line, usually resulting in a cut from one recording position to another recording position.

Figure 5:
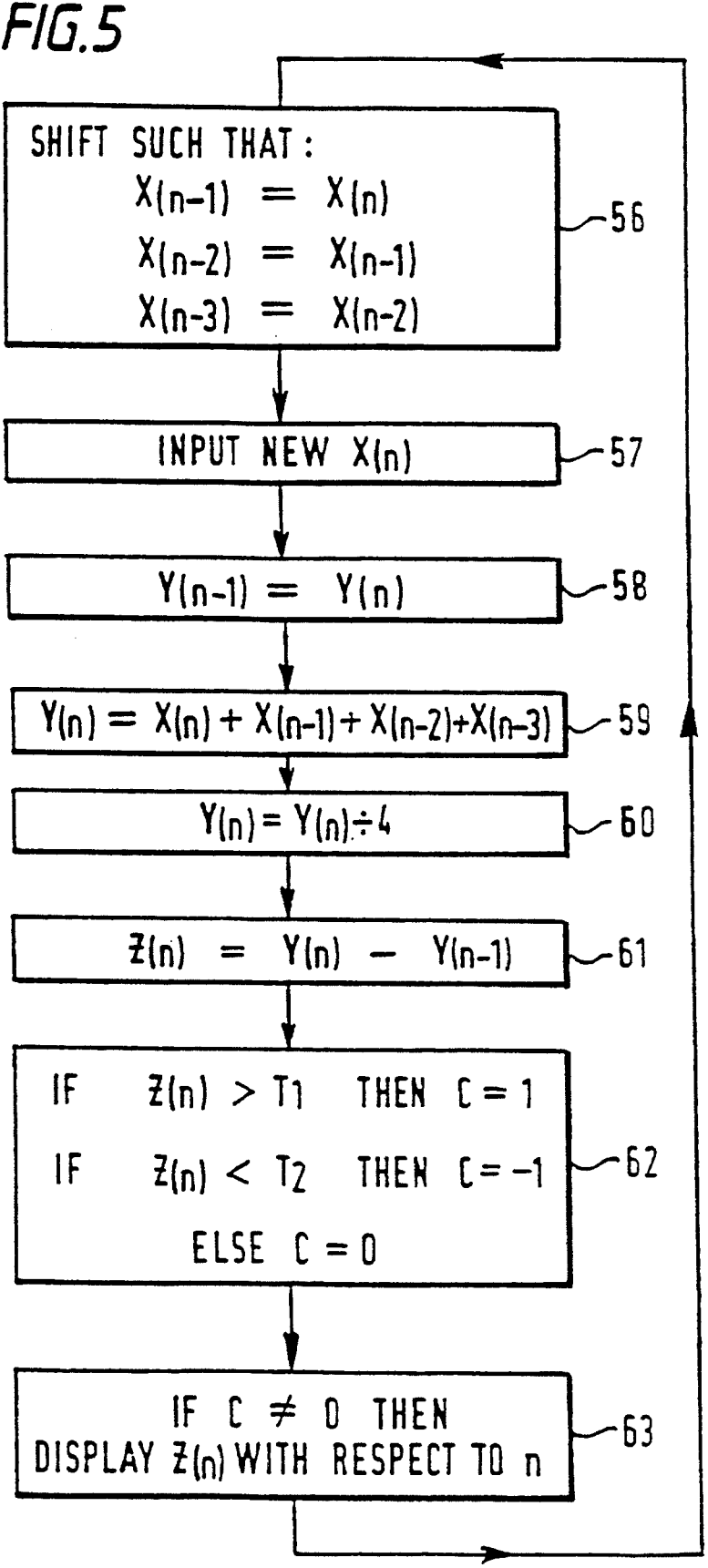
FIG. 5, 6 and 7 detail the operation of the processor device shown in FIG. 3.

The operations performed by the processing unit 38, in response to receiving data from the compression circuit 34, are shown in FIG. 5. The compression process does not change the number of frames present in the clip, therefore frames can be given unique numbers, defined by the time code, which relate to a compressed frame or it's equivalent non-compressed frame. For the purposes of the present disclosure, the frame presently being processed will be referred to as frame n, with the previous frame being referred to as frame n-1, the frame previous to that being frame n-2.

The amount of data generated after compression is identified in FIG. 5 by the value X. Thus, the amount of data produced by compressing frame n is identified in FIG. 5 as X(n) and, similarly, the amount of information produced by compression of the previous frame is identified as X(n-1).

The processing unit 38 processes numbers X in order to produce a display element 28, identifying the position of scene changes. As part of this process, the value X(n) is stored for the present frame along with values for the three previous frames.

At step 56, the stored values of X are shifted, such that the old value for X(n) becomes X(n-1), X(n-1) becomes X(n-2) and X(n-2) becomes X(n-3), making space available for a new X(n) to be received.

At step 57, the next value for X is received and at step 58, stored value for Y(n) is shifted to Y(n-1), making space available for the new Y(n) value to be received.

At step 59, the new value for Y(n) is calculated $$Y(n)=X(n)+X(n-1)+X(n-2)+X(n-3)$$

Thereafter, at step 60, Y(n) is divided by four, thereby producing an average of the four stored values of X.

At step 61, the previous value for Y, now stored as Y(n-1), is subtracted from the new value, Y(n), to produce an output value, Z(n).

Thus, the effect of this processing is to effectively differentiate the incoming numbers, so as to more accurately locate the position of an actual scene change.

At step 62, a value for C is calculated, which will be equal to zero if no scene change has been detected, or equal to plus one or minus one if a scene change has been detected. Threshold values are set for comparison, which may be adjusted during initial system setting up. Thus, at step 61 Z(n) is compared against T1 and if Z(n) is larger than T1, C(n) is set to plus one. Thereafter, Z(n) is compared against T2 and if Z(n) is smaller than T2, C(n) is set to minus one. If Z(n) falls between T1 and T2, C is set to zero, indicating that no scene change has taken place.

Figure 6:
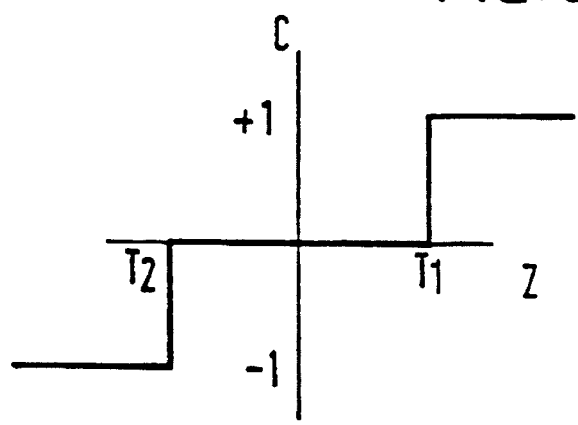

The calculation of C, with reference to the threshold values T1 and T2 is shown graphically in FIG. 6. Thus, as clearly seen from this graph, C is given a value of minus one if Z is smaller than T2, C is given a value of zero if Z is between T2 and T1, and C is given a value of plus one if Z is larger than T1.

At step 63, the value for C calculated at step 62 is considered. If C is not equal to zero, the previously calculated value for Z(n) is diplayed. Otherwise Z(n) is taken to be zero and small variations, not caused by the result of a scene change, are effectivly gated out of the signal.

Figure 7:
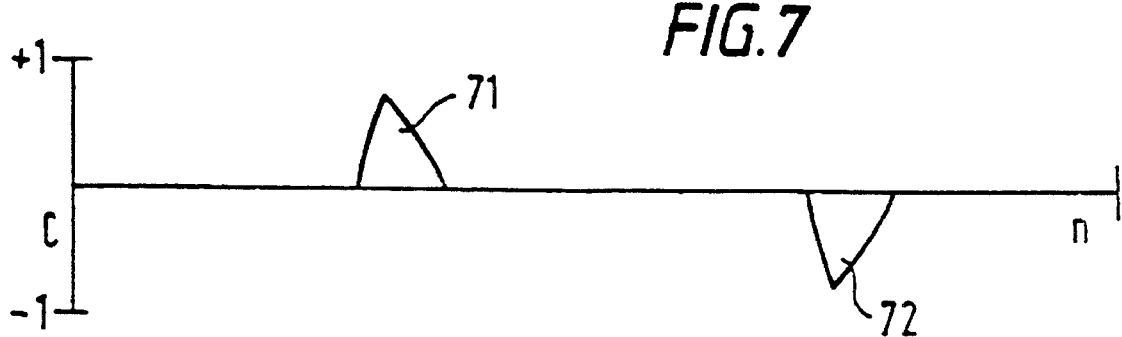

The resulting display of Z(n) plotted against n, forming the basis for the display element 28 in FIG. 2, is shown in FIG. 7. The values for n run horizontally and represent frame position. The number of pixels available for each frame position n is dependent upon the resolution, that is the number of frame positions to be displayed across the width of the image. This resolution value is adjustable, in response to commands from the operator.

In FIG. 7, the resolution has been set to show thirty seven frames of the video clip. Within this clip two scene changes occur, which have been detected and have resulted in a plus one peak 71 and a minus one peak 72. The audio editor can now quickly locate these frames by operation of the stylus, to determine whether audio editing is required at that position.

In the system shown in FIG. 1, the video source material has previously been edited and the system is provided to facilitate the editing and synchronisation of an audio track. However, the technique for identifying scene changes, as described above, could also be used to facilitate the editing of video signals, wherein scene changes may be detected to locate the position of edit points.

Figure 8:
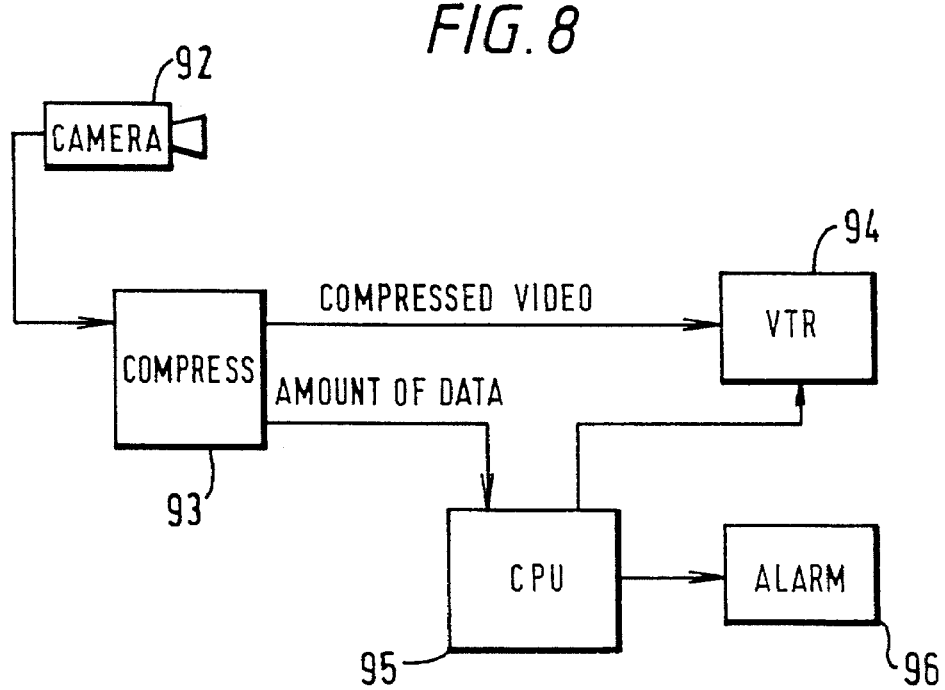
FIG. 8 shows a security system having a scene change detection circuit.

A third embodiment is shown in FIG. 8, which employs the technique of protecting scene changes within a surveillance system. A surveillance camera 92 is directed at an area, such as a bank vault or a warehouse etc, excluded from public access.

Under normal operating conditions, the image generated by the camera 92 will remain substantially constant and even if the camera 92 is subject to environmental conditions which may cause camera shake, the image will not change significantly. The video images produced by the camera 92 are compressed by a compression circuit 93, substantially similar to the compression circuitry disclosed with reference to FIG. 3. Frames of compressed video are supplied to a video tape recorder 94. In addition, information indicative of the amount of data present in each compressed frame is supplied to a central processing unit 95. Under normal conditions, the Mount of data present in each compressed field should remain substantially constant, given that the view is not changing. Furthermore, even if the camera 92 experiences shake, due to atmospheric conditions, the actual amount of information present in the picture should not change significantly, resulting in the amount of data present in the compressed video being substantially the same.

However, if an intruder enters the field of view, the amount of information in the image will change significantly, resulting it the amount of compressed video data changing significantly. This change of data present in each compressed frame is recognised by the central processing unit which is then programmed to enter a state indicating that an intruder has entered the field of view. Subject to the particular application concerned, this may result in a control signal being supplied to an alarm 96, thereby activating said alarm. Furthermore, VTR 94 may normally be in a non-activate state and an alarm signal generated by the CPU 95 may activate the VTR 94, causing frames generated by the camera 92 to be recorded. In this way, a recording facility is provided without said facility generating large amounts of unnecessary recorded material.

Alternatively, the operating characteristics of the VTR 94 may be modified. For example, during normal operation, the VTR 94 may record frames in a "slow-scan" fashion, wherein frames are recorded at substantially less than video rate. In addition, further levels of compression may be supplied to the video image, resulting in significant degradation.

However, on detecting the presence of an intruder, the recording characteristics of the VTR 94 may be modified, resulting in high bandwidth video being recorded at full video rate. Thus, the amount of unnecessary recording is reduced, while good quality pictures are obtained of the actual intruder himself.

It will be appreciated that the system for detecting scene changes in a video source may have many further applications beyond the particular embodiments described herein. The invention has particular application in systems where video compression is being employed for other purposes, particularly to reduce storage capacity and access time.

We claim:

1. A method of detecting the position of a scene change in a video frame sequence, said method comprising the steps of:

generating data representing the amount of information present in each video frame;

processing said data to locate significant changes in said amount of information between frames, and identifying the frame position of said significant changes, so as to identify the frame position of likely scene changes.

2. A method as in claim 1, wherein digital signal values (X) are generated representing the amount of information present in each frame and said values are differentiated with respect to frame times to provide an indication of the presence of a scene change.

3. A method as in claim 1, wherein said video frame sequence is derived from edited video, and scene changes are detected to facilitate the editing of an audio track.

4. A method as in claim 1, wherein said video frame sequence is derived from a source recording, and scene change detection is implemented to facilitate the editing of said video frame sequence.

5. A method as in claim 1, wherein said video frame sequence is derived from a camera and the scene change detection is performed to identify changes to the scene observed by said camera.

6. A method as in claim 5, wherein a scene change detected from said camera results in measures being taken to identify the existence of an intruder.

7. A method as in claim 6, wherein a video tape recorder is activated on the detection of said intruder.

8. A method as in claim 7, where the activation of said video tape recorder includes the modification of recording procedures for said video tape recorder, so as to enhance the quality of images recorded thereby.

9. A method as is claim 1, wherein the video frame sequence includes video field signals that are interlaced and wherein the amount of information present in each video frame is determined by determining the amount of information present in each video field.

10. A method as in claim 1 or 2, wherein the amount of information is determined by compressing video data nd assessing how much data is present after compression.

11. A method as in claim 10, wherein the video data is compressed in accordance with a spatial compression algorithm.

12. A method as in claim 11 wherein said spatial compression algorithm compresses each video field or frame and information is generated representing the amount of information present in said field or frame, after compression.

13. A method as in claim 11, wherein JPEG compression is used to compress data within each field or frame.

14. A method as in claim 11, wherein said compression algorithm divides data relating to a field or a frame into a plurality of areas.

15. A method as in claim 14, wherein said areas are processed to determine the frequency components of signals derived from said areas.

16. A method as in claim 15, wherein said frequency components are truncated to facilitate further compression.

17. A method as in claim 16, wherein said truncated frequency components are coded in accordance with a statistically related coding scheme, such as Huffman coding, to provide further data compression.

18. Apparatus for detecting the position of a scene change in a video frame sequence, said apparatus comprising:

means for generating data representing the amount of information present in each video frame;

processing means for processing said data to locate significant changes in said amount of information between frames; and display means for identifying the frame position of said significant changes, so as to identify the frame position of likely scene changes.

19. An edit suite for editing audio signals to a previously edited video track, including scene change detection apparatus according to claim 18.

20. An edit suite for editing video clips, including scene change detection apparatus according to claim 18.

21. A surveillance system including a camera arranged to observe a scene, scene change detection apparatus according to claim 18 and means for generating an output signal on detecting a change of scene.

22. A surveillance system as in claim 21, including a video tape recorder for recording an output from said camera.

23. A surveillance system as in claim 22, wherein said video tape recorder only records when an intruder is detected.

24. A surveillance system as in claim 22, wherein the operating characteristics of the video recorder are modified, so as to record pictures of improved quality, when an intruder is detected.

25. Apparatus as in claim 18, wherein said means for generating data includes compressing means for compressing video data.

26. Apparatus as in claim 18 or 25, wherein said compression means includes means for compressing said video data in accordance with a spatial compression algorithm.

27. Apparatus as in claim 26 wherein said compression means effects JPEG spatial compression.

* * * * *